United States Patent [19]

Ishida et al.

[11] Patent Number: 4,862,204

[45] Date of Patent: Aug. 29, 1989

[54] FOCUS DETECTION DEVICE AND METHOD

[75] Inventors: Tokuji Ishida, Daito; Masataka Hamada, Osaka; Toshihiko Karasaki; Toshio Norita, both of Sakai; Nobuyuki Taniguchi, Nishinomiya, all of Japan

[73] Assignee: Minolta Camera Kabushiki Kaisha, Osaka, Japan

[21] Appl. No.: 160,581

[22] Filed: Feb. 26, 1988

Related U.S. Application Data

[63] Continuation of Ser. No. 946,486, Dec. 23, 1986, abandoned.

[30] Foreign Application Priority Data

Dec. 25, 1985 [JP] Japan .................. 60-296034

[51] Int. Cl.$^4$ ............................................ G03B 3/00
[52] U.S. Cl. .................................... 354/408; 250/204
[58] Field of Search .............. 354/402, 406, 407, 408; 250/201, 201 PF, 204

[56] References Cited

U.S. PATENT DOCUMENTS

| | | | |
|---|---|---|---|
| 3,860,935 | 1/1975 | Stauffer | 250/201 |
| 3,875,401 | 4/1975 | Stauffer | 354/201 |
| 3,967,056 | 6/1976 | Yata et al. | 354/402 X |
| 4,002,899 | 1/1977 | Stauffer | 250/204 X |
| 4,387,975 | 6/1983 | Araki | 354/407 |
| 4,550,993 | 11/1985 | Taniguchi et al. | 354/402 |
| 4,561,749 | 12/1985 | Utagawa | 354/406 |
| 4,617,459 | 10/1986 | Akashi et al. | 350/204 X |
| 4,633,073 | 12/1986 | Horikawa | 354/406 X |
| 4,671,640 | 6/1987 | Akada et al. | 354/402 |
| 4,687,915 | 8/1987 | Sakai et al. | 250/204 X |
| 4,734,571 | 3/1988 | Hamada et al. | 354/406 X |
| 4,734,571 | 3/1988 | Hamada et al. | 354/406 |
| 4,766,302 | 8/1988 | Ishida et al. | 354/408 X |

FOREIGN PATENT DOCUMENTS 60-183879 of 0000 Japan .................. 354/402

Primary Examiner—W. B. Perkey
Attorney, Agent, or Firm—Price, Gess & Ubell

[57] ABSTRACT

A focus detection device which repeatedly calculates correlations between first and second image signals representing light intensity distributions on first and second image sensor arrays by shifting one of the image signals relative to the other to find an amount of shift affording the highest correlation includes shift range restriction means for restricting the shift range for the present correlation calculation in accordance with the amount of shift found through the last correlation calculation to afford the highest correlation. The shift range restriction is inhibited when the result of the last correlation calculation was not reliable indicating an infeasible condition of the focus detection.

8 Claims, 12 Drawing Sheets

Fig. 5

| | | Range of Picture Elements | Difference Data | Leftest Picture Element of R Used for Correlation Calculation | Max. Detection Range of Deviation Amount |
|---|---|---|---|---|---|
| Standard Section | 1st Block (I) | ℓ1 ~ ℓ20 | ℓS1 ~ ℓS16 | r5 (rs5) | −4 ~ 14 pitch |
| | 2nd Block (II) | ℓ11 ~ ℓ30 | ℓS11 ~ ℓS26 | r15 (rs15) | −8 ~ 8 pitch |
| | 3rd Block (III) | ℓ21 ~ ℓ40 | ℓS21 ~ ℓS36 | r25 (rs25) | −14 ~ 4 pitch |
| Reference Section | Whole Area | r1 ~ r48 | rs1 ~ rs44 | | |

FOCUS DETECTION DEVICE AND METHOD

This is a continuation of application Ser. No. 946,486 filed on Dec. 23, 1986, now abandoned.

BACKGROUND OF THE INVENTION

1. Field of the Invention

The present invention relates to a focus detection device for detecting focus condition of an objective lens with respect to an object by sensing light from the object which has passed through the objective lens of a camera.

2. Prior Art

A focus detection device has already been proposed in which object light rays having passed through first and second areas of an objective lens that are symmetric with each other with respect to the optical axis of an objective lens, are re-imaged to form two images after once having been focused to form an image of the object, and relative positions of the two images are detected to determine how much and in which direction the focused position of the object image deviates from a predetermined focal plane (whether the focused position is in front or in the rear of the predetermined focal plane, that is, whether the focus condition is a front focus or a rear focus). A typical optical system of such a focus detection device has such a construction as shown in FIG. 13. The optical system includes a condenser lens 6 on a predetermined focal plane 4 located behind an objective lens 2 or in a position behind the focal plane, and further includes re-imaging lenses 8 and 10 behind the condenser lens 6. On focal planes of the re-imaging lenses 8 and 10 are disposed image sensors 12 and 14 which have, for example, CCDs as light detectors. The images on the image sensors 12 and 14 are nearer or closer to an optical axis 1 and to each other as shown in FIG. 14 when object images 9 and 11 are formed in front of the predetermined focal plane, that is, in the case of front focus, while in the case of rear focus those images are distant from the optical axis 1. When the objective lens 2 is in just focus or in-focus condition, the distance between two corresponding points of the two images 9 and 11 has a specific value determined by the construction of the optical system of the focus detection device. Basically, therefore, a focus condition can be determined by detecting the distance between the two corresonding points of the two images.

In an automatic focusing device of a camera which incorporates a focus detecting optical system of the type mentioned above, the sequence of integrating object light quantities by CCD image sensors, detecting and calculating a focus condition (calculating the amount of defocus) using outputs of the CCD image sensors, driving lens according to the amount of defocus and stopping it at in-focus position (shutter release in the case of the shutter button being depressed), is controlled in accordance with a program by means of a control circuit which is constituted by a microcomputer.

The above automatic focusing device performs the aforementioned sequential automatic focusing (AF) control even when the object image is about to be in focus so that in-focus position can be set finally exactly.

In effecting focus detection, the spacing between the images on the image sensors 12 and 14 must be detected. To this end, correlation is determined with respect to two light intensity destributions on the image sensors 12 and 14. Outputs of the light detectors which constitute the image sensors 12 and 14 are shifted relative to one another to obtain an amount of shift which affords the best correlation (i.e. spacing of the two images).

A considerable time is required for the calculation of such correlation because this calculation is performed by relatively shifting the outputs over a wide range. As a result, there arise problems such as deteriorated response characteristic of the automatic focusing device and deteriorated follow-up performance for a moving object.

The follow-up performance for a moving object will now be considered. In such automatic focusing device as mentioned above, if an amount of defocus is detected by a single focus detection and the objective lens is moved to in-focus position on the basis of the said amount of defocus, for example, when an object is approaching or going away from the camera, it will be impossible to obtain a just focus or in-focus condition because of movement of the object during that period.

This is as illustrated in FIG. 15, in which time base is plotted along the axis of abscissa and the amount of defocus plotted along the axis of ordinate. In this figure, a curve l shows how the amount of defocus on the film surface increases as the object approaches at a constant speed, and a straight line m indicates results obtained by following up positions in which the objective lens was about to focus. I in the time axis represents a period of time for the light integration (charge accumulation) by the image sensors and C represents a period of time for the calculation of the amount of defocus. The object approaches the camera even during the calculation time period, so even if the lens is driven on the basis of the result of the calculation, the object has already moved at the time the lens has stopped. With approach of the object, the amount of defocus increases and soon goes out of the depth of field, resulting in out-of-focus.

It is therefore necessary to make the calculation time period as short as possible.

In Japanese Patent Laid Open No. 126517/84 there is proposed a method in which a detection zone of a standard area of an image sensor is divided into three blocks and outputs of those blocks are shifted relative to the whole region of output of a reference area of the image sensor to determine an amount of shift which affords best correlation for each of those blocks and to find one corresponding to the highest correlation as a whole from the amounts of shift thus determined for those blocks. According to such proposed method, however, it is impossible to attain an effective shortening of time because at every detection of focus the output of each block of the standard area is subjected to calculation over the whole range of the output of the reference area.

In Japanese Patent Laid Open No. 75607/81 there is proposed a method in which the maximum amount of shift is determined using the amount of shift found as affording the highest correlation at the first time focus detection because the amounts of shift to be found as affording the highest correlation at the second time and the following focus detections are not larger than the amount of shift at the first time focus detection. In the case of a large amount of shift, however, it is necessary that the calculation be performed over a wide range, thus resulting in much time required for the calculation; besides, a more complicated control results because the amount of shift must be changed each time. Further, since it is impossible to cope with infeasible condition of focus detection, there is fear that it would become no longer possible to effect a continuous automatic focusing.

SUMMARY OF THE INVENTION

Accordingly, it is an object of the present invention to provide a focus detection device which can shorten the period of time required for calculation for detecting the focus condition of an objective lens.

Another object of the present invention is to provide a focus detection device which makes it possible to effect a continuous automatic focusing at a high speed even when an infeasible condition of focus detection is once detected.

To accomplish these objects, a focus detection device of the present invention is provided with first and second image sensor arrays for sensing first and second images formed by an optical means such that the relative position thereof varies with the focus condition of an objective lens. First and second image signals representing light intensity distributions on the first and second image sensor arrays are produced by these sensor arrays, respectively. Calculation means is provided for shifting one of the first and second image signals relative to the other to calculate correlations between the image signals and thereby to find an amount of shift affording the highest correlation. This calculation means is repeatedly operated by control means and a focus condition signal representing the focus condition of the objective lens is produced by focus condition signal producing means in accordance with the amount of shift found to afford the highest correlation through each operation of the calculation means. Shift range restriction means restricts the range of shift for the present correlation calcualtion by the calculation means in accordance with the amount of shift found through the last correlation calculation by the calculation means to afford the highest correlation, while inhibition means inhibits the operation of the shift range restriction means when the calculation result of the calculation means through the last correlation calculation was determined not to be reliable by reliability determination means indicating an infeasible condition of the focus detection.

The method of the shift range restriction may be such that the shift range for the present correlation calculation is restricted to a range with a predetermined width centering at an amount of shift affording the highest correlation in an in-focus condition or to different ranges depending on whether the amount of shift found through the last correlation calculation by the correlation means to afford the highest correlation was on the front focus side or the rear focus side with respect to the amount of shift affording the highest correlation in the in-focus condition. More particularly, in the latter method, the shift range is set to a first range between the amount of shift found through the last correlation calculation to afford the highest correlation and an amount of shift which is on the front focus side by a first predetermined amount from the amount of shift affording the highest correlation in the in-focus condition when the amount of shift found through the last correlation calculation to afford the highest correlation was on the rear focus side, while it is set to a second range between the amount of shift found through the last correlation calculation to afford the highest correlation and an amount of shift which is on the rear focus side by a second predetermined amount from the amount of shift affording the highest correlation in the in-focus condition when the amount of shift found through the last correlation calculation to afford the highest correlation was on the front focus side. Preferably, the first and second predetermined amounts are determined to be identical.

The focus detection device having the above construction makes it possible to shorten the period of time required for the production of the focus condition signal due to the shift range restriction effected by the shift range restriction means. Further, when the calculation result of the calculation means obtained through the last correlation operation was not reliable, the shift range restriction is inhibited by the inhibition means, so that the present correlation calculation by the calculation means is effected without of restriction of the shift range. Thus, a continuous automatic focusing is made possible at a high speed even when an infeasible condition of focus detection is detected.

The above and other objects and features of the present invention will become more apparent from the following description of preferred embodiments of the present invention taken in conjunction with the accompanying drawings.

BRIEF DESCRIPTION OF THE DRAWINGS

FIG. 5 is a diagram showing the manner of division of the CCD image sensor array;

DESCRIPTION OF PREFERRED EMBODIMENTS

Embodiments of the present invention will be described hereinafter concretely in the following order with reference to the accompanying drawings:
a: Construction of Focus Detection Device
b: Flow of Automatic Focusing
c: Detection of Amount of Defocus

(a) Construction of Focus Detection Device

Figure 1:
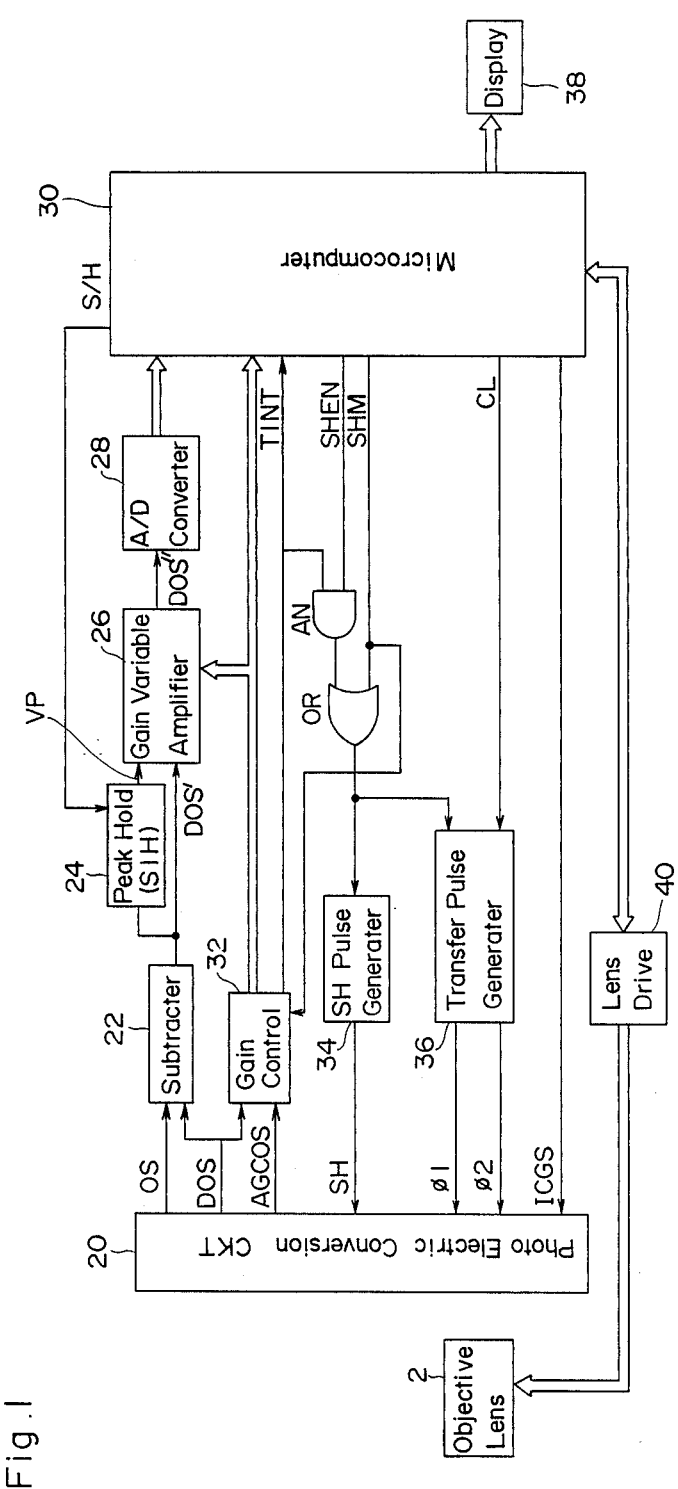
FIG. 1 is a block diagram of an automatic focusing system employing a focus detection device of the present invention.
Figure 3:
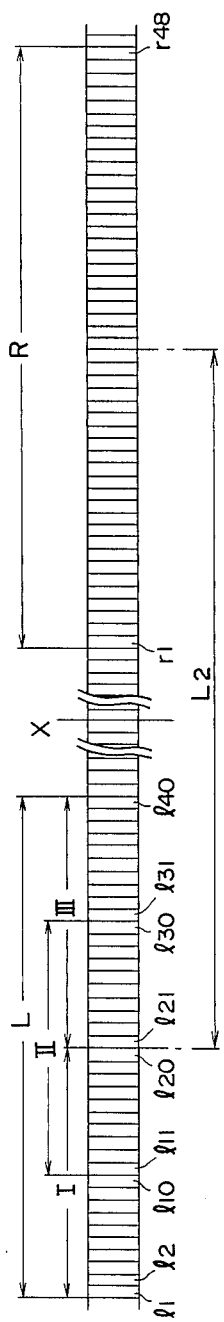
FIG. 3 is a diagram showing arrangement of picture elements of a single CCD image sensor array used for the focus detection device of the present invention.

With reference to FIG. 1, first and second CCD image sensors 12 and 14 are provided as a single image sensor in a photoelectric converter circuit 20. The sensors 12 and 14 correspond to a standard area L and a reference area R of the single image sensor, respectively, as shown in FIG. 3.

A control circuit 30 constituted by a microcomputer starts a focus detecting operation upon one-step depression of a shutter release button (not shown) when a focus detection mode switch (not shown) in ON.

Integration clear signal, ICGS, of a pulse format is provided from the control circuit 30 to the first and second CCD image sensors 12 and 14 provided in the photoelectric converter circuit 20, whereby picture elements of the CCD image sensors are reset to initial state and at the same time an output AGCOS of a brightness monitor circuit (not shown) incorporated in the photoelectric converter circuit 20 is set to the level of the supply voltage. At the same time, the control circuit 30 provides a shift pulse generation permission signal, SHEN, of "HIGH" level. Then, upon disappearance of the integration clear signal ICGS, integration of light (charge accumulation) starts in each picture element within the CCD image sensors, and at the same time the output AGCOS of the brightness monitor circuit begins to decrease at a rate proportional to the object brightness. But a reference signal output, DOS, from a reference signal generating circuit incorporated in the photoelectric converter circuit 20 is maintained at a constant level. The gain control circuit 32 compares AGCOS with DOS and controls the gain of a gain-variable differential amplifier 26 according to the degree of decrease of AGCOS relative to DOS. On detecting that AGCOS decreased beyond a predetermined level relative to DOS within a predetermined time period after disappearance of the integration clear signal ICGS, the gain control circuit 32 provides a TINT signal of "High" level. The TINT signal is fed to a shift pulse generating circuit 34 through an AND circuit AN and an OR circuit OR. In response thereto, a shift pulse SH is provided from the circuit 34. When the shift pulse SH is fed to the photoelectric converter circuit 20, the integration of light by the picture elements of the CCD image sensors 12 and 14 is over and electric charges, the amounts of which are proportional to the integrated light quantities, are transferred in a parallel fashion from the picture elements to the corresponding cells of a shift register of the CCD image sensors.

On the other hand, two sensor driving pulses $\phi 1$ and $\phi 2$ which are 180° out of phase with each other are provided from a transfer pulse generating circuit 36 to the photoelectric converter circuit 20 in accordance with clock pulses CL provided from the control circuit 30. The CCD image sensors 12 and 14 send out electric charges transferred to the cells of the shift register serially one by one from an end in synchronism with a leading edge of $\phi 1$ of the sensor driving pulses $\phi 1$ and $\phi 2$, and output signals OS successively which form image signals. The lower the intensity of light incident on each picture element, the higher the voltage of each signal OS, and a subtraction circuit 22 subtracts this signal from the reference signal DOS and outputs the result (DOS-OS) as a picture element signal. Upon lapse of a predetermined time without receipt of a TINT signal after the disappearance of the integration clear signal ICG, the control circuit 30 produces a shift pulse generation command signal of "High" level. Therefore, where no TINT signal of "High" level is provided from the gain control circuit 32 even upon lapse of the predetermined time after disappearance of the integration clear signal ICG, the shift pulse generation circuit 34 generates a shift pulse SH in response to the shift pulse generation command signal SHM.

In the above operation, when there are provided picture element signals corresponding to the first to tenth picture elements of the CCD image sensors, the control circuit 30 produces a sample hold signal S/H. This portion of the CCD image sensors is aluminum-masked with a view to obtain a dark current component, and as light sensing picture elements of the CCD image sensors this portion is in a light-shielded state. On the other hand, in accordance with the sample hold signal, a peak hold circuit 24 holds the picture element signals DOS' corresponding to the aluminum-masked picture elements of the CCD image sensors, and thereafter produces an output signal VP corresponding to these picture element signals DOS' and fed to the gain variable amplifier 26, which in turn amplifies the differences between the output signal VP and picture element signals corresponding to the remaining picture elements of the image sensors at a gain controlled by a gain control circuit 32. The thus amplified outputs DOS' are converted from analog to digital by means of an A/D converter 28 and then received by the control circuit 30 as digital picture element signal data. The A/D conversion in the A/D converter 28 is performed using eight bits at a time, while the transfer to the control circuit 30 is effected using four bits of high order and another four bits of low order.

Thereafter, the control circuit 30 stores the picture element signal data successively in its internal storing means, and upon completion of the storage of data corresponding to all the picture elements of the CCD image sensors, the control circuit 30 processes those data in accordance with a predetermined program as will be explained hereinafter to calculate amount and direction of defocus, and makes a display circuit 38 display results of the calculation. Subsequently, the control circuit 30 drives a lens driving unit 40 according to the calculated amount and direction of defocus to effect an automatic focusing of an objective lens 2.

(b) Flow of Automatic Focusing

Figure 2:
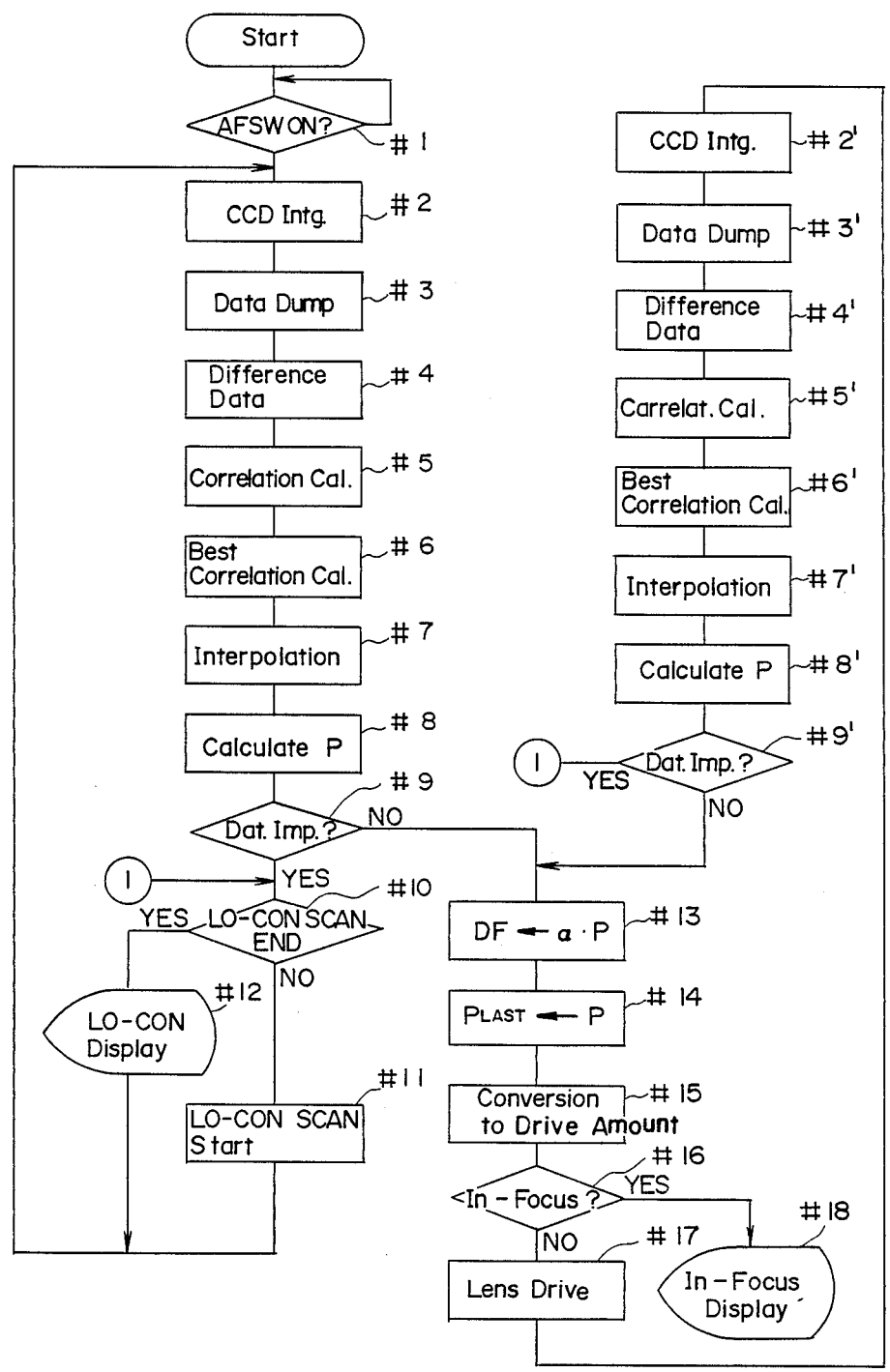
FIG. 2 is a flow chart showing the automatic focusing operation of the automatic focusing system.

FIG. 2 shows a flow of automatic focusing operation controlled by the control circuit 30. Upon turning ON of a power switch (not shown), the camera is supplied with electric power. As a result, the flow of FIG. 4 starts and the control circuit 30 waits for turning ON of an AF switch at an AF switch discrimination flow of step #1. Upon turning ON of the AF switch, the control circuit 30 causes the image sensors to store electric charge in step #2 ("step" will be omitted hereinafter).

When this is over, signals are produced as signals OS successively from the image sensors. The signals OS are each subjected to subtraction in the subtraction circuit 22 to form picture element signals. These picture element signal are amplified at a gain determined according to the brightness of the object as monitored by the brightness monitoring circuit and then converted from analog to digital in the A/D converter 28 to give digital picture element signal data. The control circuit 30 receives both this data and the aforesaid gain data from the gain control circuit 32. Then, in #4, difference data are prepared from the picture element signals in a manner to be described later in order to remove a low-frequency signal component biasing the picture element signals. Then, in #5, a correlation calculation is performed with respect to the outputs in the standard area L and reference area R, and a portion of the reference area which is of the highest or best correlation as a whole is calculated in #6. Further, in #7, there is performed an interpolation calculation, then in #8, an image spacing deviation P is calculated, and in #9, judgment is made as to whether the image spacing deviation P thus obtained is highly reliable or not. If the image spacing deviation P thus obtained is not highly reliable, it is judged that focus detection is impossible.

Thus, whether it is possible or not to effect focus detection is judged in #9. For example, when one or more of the following conditions are satisfied, it is judged that the detection of focus is infeasible: (i) A value normalized in terms of contrast of the best correlation value is not smaller than a predetermined level; (ii) Contrasts of light intensity distributions on the standard area and the reference area are not larger than a predetermined value; (iii) Peak value of the light intensity distributions on the standard area and the reference area is not larger than a predetermined value. Once it is judged in #9 that the detection is infeasible, there is made a judgment in #10 as to whether LO-CON SCAN is over or not. By "LO-CON SCAN" what is meant is that the lens is driven on trial while continuing the focus detecting operation, expecting the presence of a lens adjustment position which permits the detection of focus. If LO-CON SCAN is over in #10, there is made a LO-CON display (not shown) in #12 and the operation returns again to the CCD integration flow of #2. If LO-CON SCAN is not completed yet, it is started in #11 followed by return to the CCD integration flow of #2.

Once it is judged in #9 that the detection is feasible, the image spacing deviation is converted to the amount of defocus (focus deviation) DF in #13. The image spacing deviation P is made into $P_{LAST}$ in #14, and the amount of defocus DF is in turn converted in #15 to an amount of lens drive for shifting of the lens. Then, in #16, there is made a judgment as to whether the amount of defocus DF thus obtained or amount of lens drive is within in-focus range or not. If the answer is affirmative, there is made an in-focus display (not shown) in #17, while if the answer is negative, the lens is driven in #17 according to the amount of lens drive obtained in #15 and the operation proceeds to the second light integration #2', followed by the same operations for focus detection as above, and this loop is repeated.

A series of the above operations are described in more detail in the copending U.S. patent application Ser. No. 570,012 filed on Jan. 10, 1984 and assigned to the same assignee as the present application, so only the portions related to the present invention will be explained below in detail.

(c) Detection of Amount of Defocus

Figure 4:
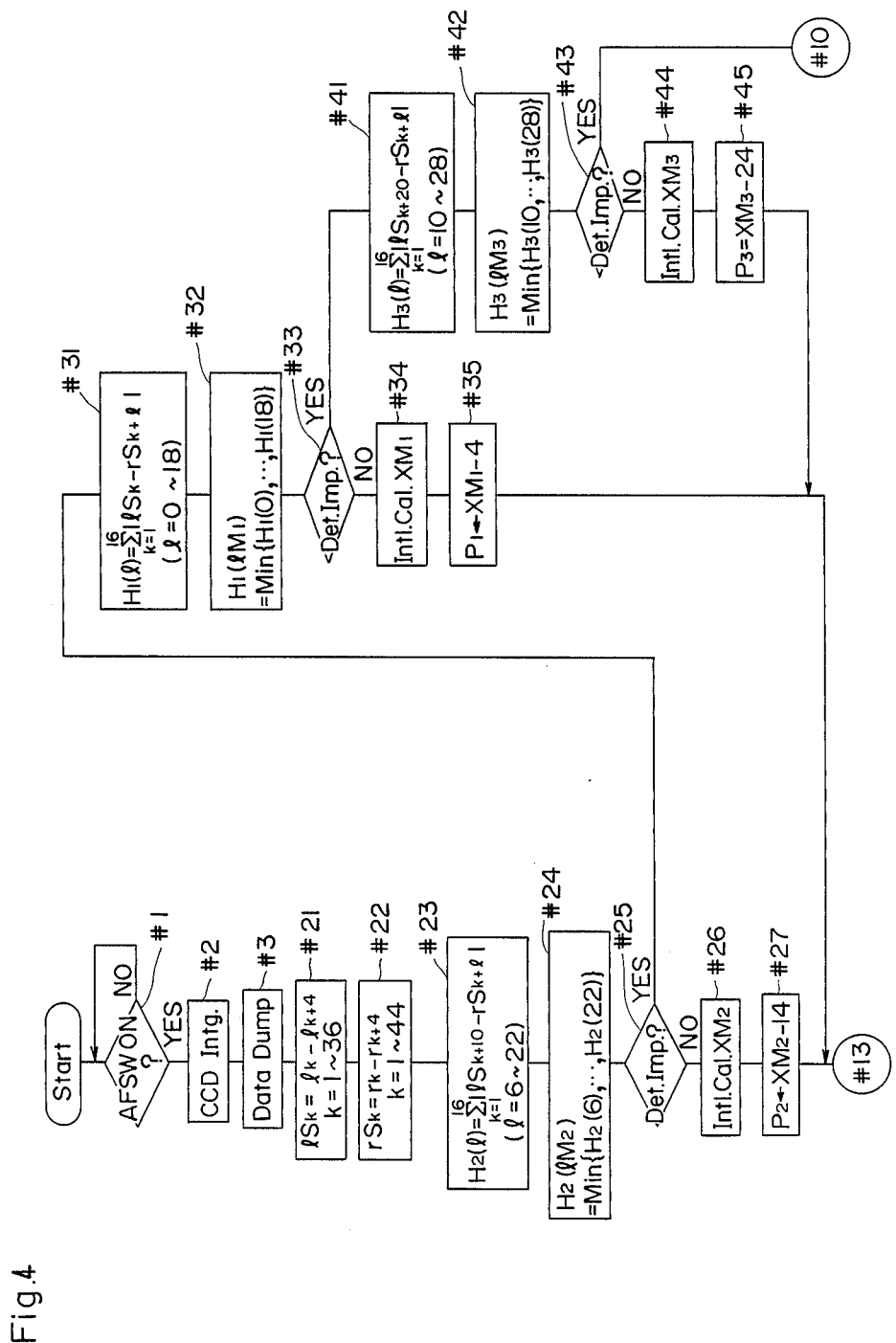
FIG. 4 is a flow chart showing the steps corresponding to steps #1 to #9 of the flow chart shown in FIG. 2 and executed in the case the CCD image sensor array shown in FIG. 3 is divided into three blocks at a standard area or section.

FIG. 4 is a flow chart showing detailed examples of #1 to #9 in FIG. 2, in which the standard area L of the CCD image sensor is divided into three blocks, image spacing deviations for those blocks are calculated, and an amount of shift judged to afford highest correlation as a whole among best correlations for those blocks is adopted as an image spacing deviation from the in-focus position to drive the lens.

Since the principle of calculation for the amount of defocus is fully disclosed in the above mentioned copending patent application Ser. No. 570,012, concrete processings will be described below.

Figure 6:
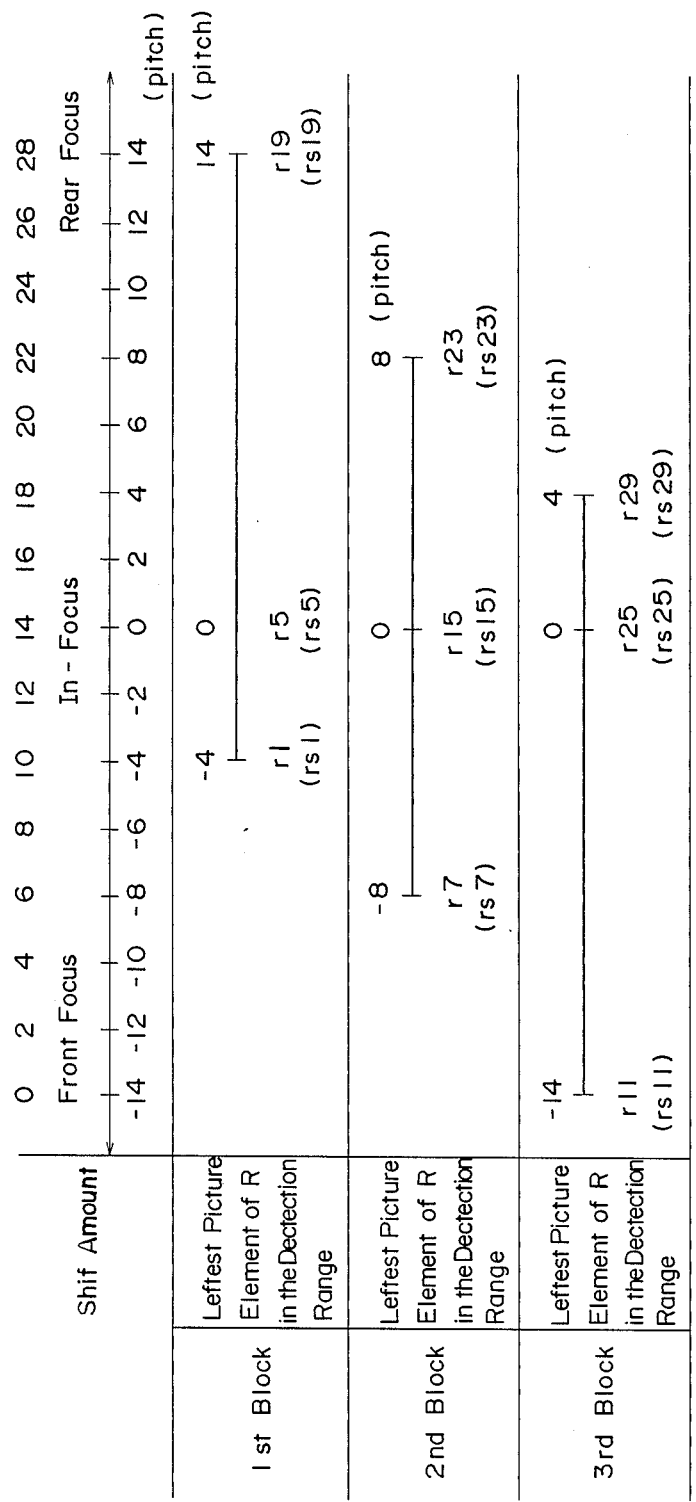
FIG. 6 is a diagram showing the shift ranges determined for the respective blocks of the standard area of the CCD image sensor array.

Before explanation of concrete flows, reference will now be made to the contruction of the CCD image sensors 12 and 14. As shown in FIG. 3, a single CCD image sensor is divided into a standard area L consisting of picture elements $l_1$ to $l_{40}$ and a reference area R consisting of picture elements $r_1$ to $r_{48}$, on both sides of an intermediate separation zone. The standard area L and the reference area R correspond to the image sensors 12 and 14 as described earlier. The standard area L is divided into a first block I consisting of picture elements $l_1$ to $l_{20}$, a second block II consisting of picture elements $l_{11}$ to $l_{30}$, and a third block III consisting of picture elements $l_{21}$ to $l_{40}$. Thus the first and second blocks and the second and third blocks overlap with each other. The spacing between two images formed in the reference area R and the standard area L corresponds to a distance $L_2$ in a just focus or in-focus condition. Picture element signal data of a predetermined number of continuous picture elements in the first to third blocks of the standard area L are compared with the same number of continuous picture elements of the reference area R successively by shifting, and an image spacing deviation (amount of defocus) is determined from the amount of shift which affords the highest correlation. The correlation calculation is performed first for the second block II located centrally of the standard area L, and if an effective minimum value indicating the highest correlation is not found out as a result of the correlation calculation, the same calculation is executed for the first block I and then for the third block III. In this case, image spacing deviations detected for the first to third blocks overlap partially in the reference area R, as shown in FIGS. 5 and 6.

In this correlation calculation, picture element data $l_k$ ($k=1-40$) and $r_k$ ($k=1-48$) in the standard area L and the reference area R respectively are not used directly as they are in this embodiment, but difference data $ls_k = l_k - l_{k+4}$ ($k=1-36$) and $rs_k = r_k - r_{k+4}$ ($k=1-44$) are used to reduce the influence of a low frequency component biasing the picture element data. In the blocks II, I and III there are used $ls_{k+10}$, $ls_k$, and $ls_{k+20}$ ($k=1-16$), respectively, as bases and correlation values $H_2(l)$, $H_1(l)$ and $H_3(l)$ are determined by the following equations:

$$H_2(l) = \sum_{k=1}^{16} |ls_{k+10} - rs_{k+l}| \ (l = 6 - 22)$$

$$H_1(l) = \sum_{k=1}^{16} |ls_k - rs_{k+l}| \ (l = 0 - 18)$$

-continued $$H_3(l) = \sum_{k=1}^{16} |ls_{k+20} - rs_{k+l}| \quad (l = 10 - 28)$$

And amounts of shift $lM_2$, $lM_1$ and $lM_3$ which afford the highest correlations for the blocks II, I and III are respectively determined from the amount of shift $l$ which gives rise to the lowest correlation value, namely:

$H_2(lM_2) = \text{Min}\{H_2(6), \ldots, H_2(22)\}$ $H_1(lM_1) = \text{Min}\{H_1(0), \ldots, H_1(18)\}$ $H_3(lM_3) = \text{Min}\{H_3(10), \ldots, H_3(28)\}$ On the basis of the amount of shift $lM_i$ ($i = 1$, 2 or 3) thus obtained and using the amounts of shift being smaller and larger than $lM_i$ by one, there is performed interpolation calculation, and an accurate image spacing $XM_i$ ($i = 1$, 2 or 3) is obtained, namely:

When $H_i(lM_i - 1) \geq H_i(lM_i + 1)$, $$XM_i = lM_i + \frac{1}{2} \cdot \frac{H_i(lM_i - 1) - H_i(lM_i + 1)}{H_i(lM_i - 1) - H_i(lM_i)}$$

When $H_i(lM_i - 1) < H_i(lM_i + 1)$, $$XM_i = lM_i + \frac{1}{2} \cdot \frac{H_i(lM_i - 1) - H_i(lM_i + 1)}{H_i(lM_i + 1) - H_i(lM_i)}$$

<c—1> First Embodiment

This embodiment is characterized by restricting the maximum amount of shift $l_{max}$ and the minimum amount of shift $l_{min}$ of parameter $l$ for determining a reference position in the reference area R on the basis of the amount of shift affording the highest correlation as a whole and obtained previously through the last correlation calculation, in order to shorten the time required for the present correlation calculation. More specifically:

(I) Where the highest correlation as a whole was obtained last time in the second block, the same block is also used this time, but:

(i) in the case of rear focus last time:

the maximum amount of shift is set to the previous maximum amount of correlation, while the minimum amount of shift is set to the amount of shift one pitch on the front focus side from the amount of shift in in-focus condition.

(ii) in the case of front focus last time:

the maximum amount of shift is set to the amount of shift one pitch on the rear focus side from the amount of shift in in-focus condition, while the minimum amount of shift is set to the previous amount of shift affording the maximum correlation.

(II) Where the highest correlation as a whole was obtained last time in the first block (rear focus):

The second block is also used this time, and the maximum amount of shift is set to the rear focus side limit in the second block, while the minimum amount of shift is set to the amount of shift one pitch on the front side from that in in-focus condition.

If the detection is impossible under this condition, it is performed using the first block.

(III) Where the highest correlation as a whole was obtained last time in the third block (front focus):

The second block is also used this time, and the maximum amount of shift is set to the amount of shift one pitch on the rear focus side from that in in-focus condition, while the minimum amount of shift is set to the front focus side limit in the second block.

If the detection is impossible under this condition, it is performed using the first block, and if this is again impossible, the detection is made using the third block.

Since the shift range becomes narrower gradually, it becomes possible to further shorten the calculation speed.

The following is a concrete explanation about detection of the amount of defocus in accordance with the flow chart of FIG. 4.

Upon turning ON of the AF switch, every fourth difference data $l_{sk}$ and $r_{sk}$ are prepared from the picture element data $l_k$ and $r_k$ of the standard area L and reference area R in #21 and #22 through #1, #2 and #3.

Next, in #23 and #24, there are calculated correlation values representing the correlations between the difference data belonging to the second block (the standard area portion over the range of ±8 pitches from the in-focus position) and the difference data belonging to the reference area to determine $lM_2$ indicating the amount of shift affording the highest correlation for the second block. In #25, there is made a judgment as to whether the correlation calculation in #23 and #24 is highly reliable or not, in other words, whether the detection is feasible or not. If the answer is affirmative, then an interpolation calculation is made in #26 and #27 to determine the amount of shift $XM_2$ which is a highly accurate from the picture element data $lM_2$ and $lM_2 \pm 1$ larger and smaller than $lM_2$ by one, and an image spacing deviation $P_2$ is calculated. And the operation proceeds to #13 in FIG. 2 to determine the amount of defocus DF from the image spacing deviation $P_2$.

On the other hand, when it is impossible to effect the detection in #25, the operation proceeds to #31 to start calculation for the first block, which calculation is a correlation calculation over the shift range from —4 pitch to +14 pitch in terms of deviation pitch. And in #32 there is calculated $lM_1$ indicating the amount of shift affording the highest correlation for the first block. Then, in #33, judgment is made as to whether the correlation calculation just performed is highly reliable or not. If the correlation calculation is reliable and the detection is feasible, the operation proceeds to #34 to effect an interpolation calculation and the image spacing deviation pitch $P_1$ is calculated in #35, then the operation further proceeds to #13 as in the case of the second block.

Where it is judged in #33 that the reliability of the correlation calculation is low and the detection impossible, the operation proceeds to #41 to start calculation for the third block, which calculation is a correlation calculation over the shift range from —14 pitch to +4 pitch in terms of deviation pitch. Thereafter, like for the other blocks, an amount of shift $lM_3$ affording the highest correlation for the third block is calculated in #42 and judgment is made in #43 as to whether the detection is feasible or not. If the answer is affirmative, an interpolation calculation is made in #44 and an image spacing deviation pitch $P_3$ is calculated in #45, then the operation proceeds to #13. On the other hand, if the answer is negative in #43, this means that the detection was impossible in all of the correlation calculations for the first, second and third blocks, and the operation proceeds to #10 in FIG. 2 to enter a processing routine in low contrast.

On the other hand, in the processing routine from #13 (FIG. 2) to be carried out when the detection is feasible, the amount of defocus (#13, #14) and that of lens drive (#15) are determined, and if the focus condition is not in-focus condition, driving of the lens is started from #17. The system being considered is of a type in which the calculation for focus detection is repeated even while the lens is being driven. Execution of #17 leads to the second calculation for focus detection beginning with #2'.

Figure 7:
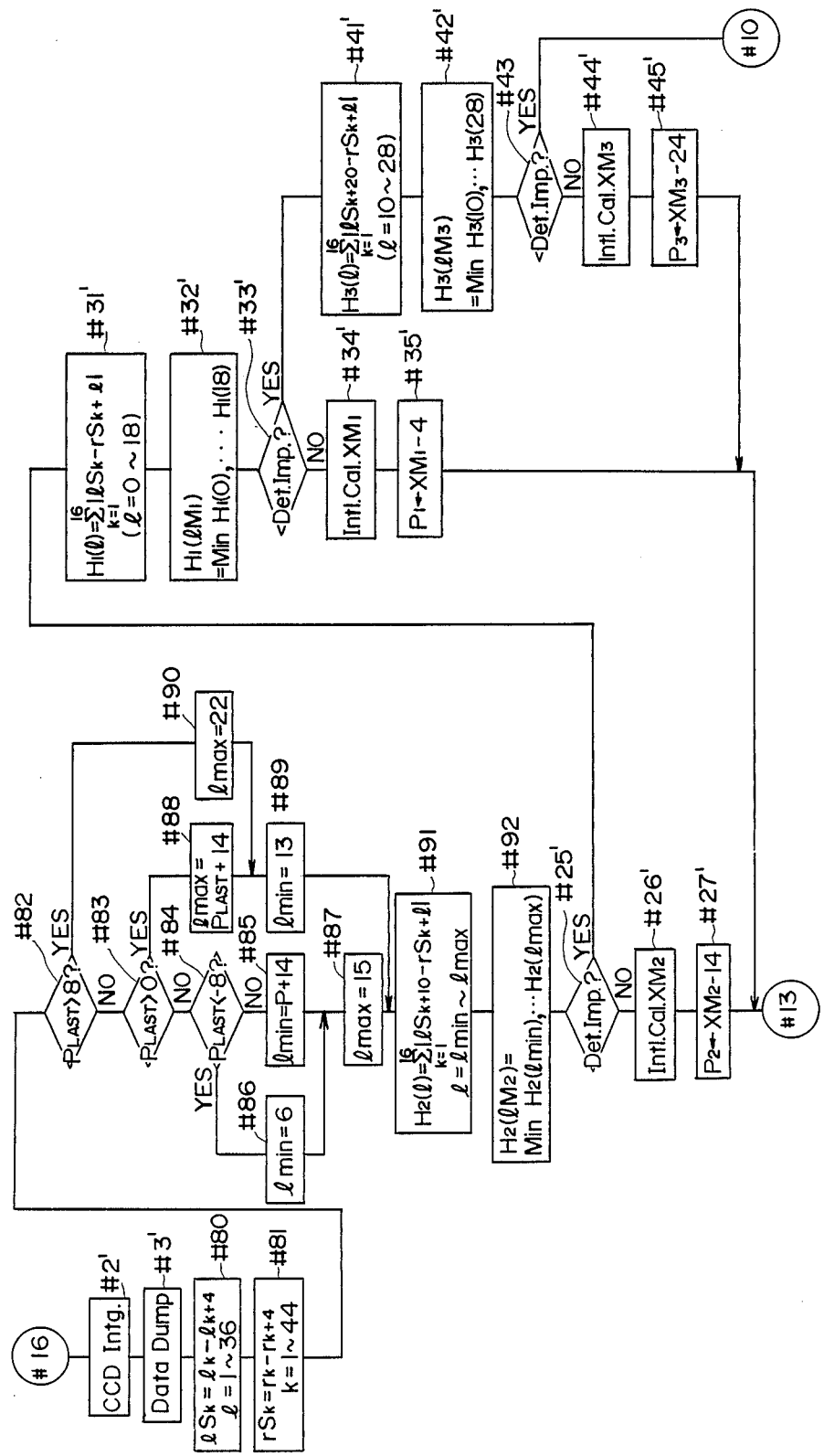
FIG. 7 is a flow chart showing the steps corresponding to the steps #2' to #9' of the flow chart shown in FIG. 2 and characteristic to a first embodiment of the focus detection device of the present invention.

Referring now to FIG. 7, there are shown details of #2' to #9' in the form of a flow chart. In #2' light integration and is effected by the CCD image sensor array in #3' the picture element data are taken in by the control circuit 30. In #80 and #81 correlative pre-processings for the picture element data are effected, that is, difference data $ls_k$ and $rs_k$ are prepared. From #82 to #90, the range of correlation calculation of this time is determined on the basis of the image spacing deviation $P_{LAST}$ obtained in the last calculation for focus detection. The deviation $P_{LAST}$ corresponds to the value P obtained in #8 in FIG. 2. Because of the range limit for the second block, a check is made on the maximum deviation range ±8 in the same block. First in #82 there is made a judgment as to whether $P_{LAST}$ is larger or smaller than +8, and if it is larger, the $l_{max}$ expressed in terms of a picture element position in the reference area is set at 22 as the maximum correlation limit. On the other hand, if it is smaller, then judgment is made in #83 as to whether $P_{LAST}$ is positive or negative, that is, whether rear focus or front focus, and if it is positive, the $l_{max}$ is determined to be P+14 in #88. In other words, in the case of rear focus last time, the maximum limit of the next correlation calculation is the amount of shift on the rear focus side, which was found through the last calculation to afford the highest correlation as a whole. Conversely, in #89, a minimum limit is determined as $l_{min}=13$. This represents a front focus by one pitch from the amount of shift in in-focus condition. A more concrete example will be explained later using FIG. 8.

On the other hand, if $P_{LAST}$ is negative in #83, this indicates a front focus, so $P_{LAST}$ is assumed to be its minimum limit in #84 and $l_{min}$ is determined to be 6 ($l_{min}=6$). If $P_{LAST}$ is larger than $-8$, $l_{min}=P=14$, with the minimum correlation limit as a function of the result of the last calculation. And the maximum limit is determined to be $l_{max}=15$ one pitch behind the amount of shift in in-focus condition in #87. In this way a detection range in the present correlation calculation is determined. In #91, this range of correlation calculation is performed in the second block using the $l_{min}$ and $l_{max}$. In #92, there is obtained the highest correlation as a whole between the $l_{min}$ and the $l_{max}$, and in #25' there is made a judgment as to whether the detection is feasible or not. If the answer is affirmative, an interpolation calculation is made in #26', and an image spacing deviation $P_2$ from the in-focus position is determined in #27', then the operation again proceeds to #13 in FIG. 4. Thereafter, the flow from #2' is repeated until the in-focus condition is obtained. Since the correlation detection range is, i.e., the range of shift for the correlation calculation restricted from this second calculation for focus detection, the calculation time during the lens drive is shortened to a considerable extent, thus greatly contributing to the improvement of follow-up performance.

If the detection is infeasible in #25', there are performed the correlation calculation for the first block in #31' to #35' and that for the third block in #41' to #45'. In these first and third blocks the calculations at first cover the whole range because no special restriction is placed thereon. But, also in the first and third blocks, like the second block, the correlation detection range may be restricted in accordance with the result of the last calculation.

A calculation example in the first embodiment will now be described with reference to FIG. 8. The number line in the figure represents deviation pitches from the amount of shift in in-focus condition, the lower numerical values representing deviation pitches (±) and the upper values representing amounts of shift on picture elements of the reference area. First, in the example ⓐ, it is assumed that as a result of the last calculation for focus detection there occurred a deviation of $-5$ pitch on the front focus side (current maximum correlation amount). At this time, the correlation detection range in the present calculation for focus detection corresponds to a deviation range from $-5$ pitch to $+1$ pitch, that is, $l_{min}$ and $l_{max}$ are 9 and 15 respectively. It follows that the calculation covers only this range during movement of the lens and that this range becomes more and more narrow because the calculation is repeated during lens movement. ⓑ is an example in which there occurred a deviation of $+8$ pitch on the rear focus side as a result of the last calculation. In this case, the correlation detection range in the present calculation for focus detection during lens movement is from $-1$ pitch to $+8$ pitch, that is $l_{min}$ and $l_{max}$ are 13 and 22, respectively.

Figure 9:
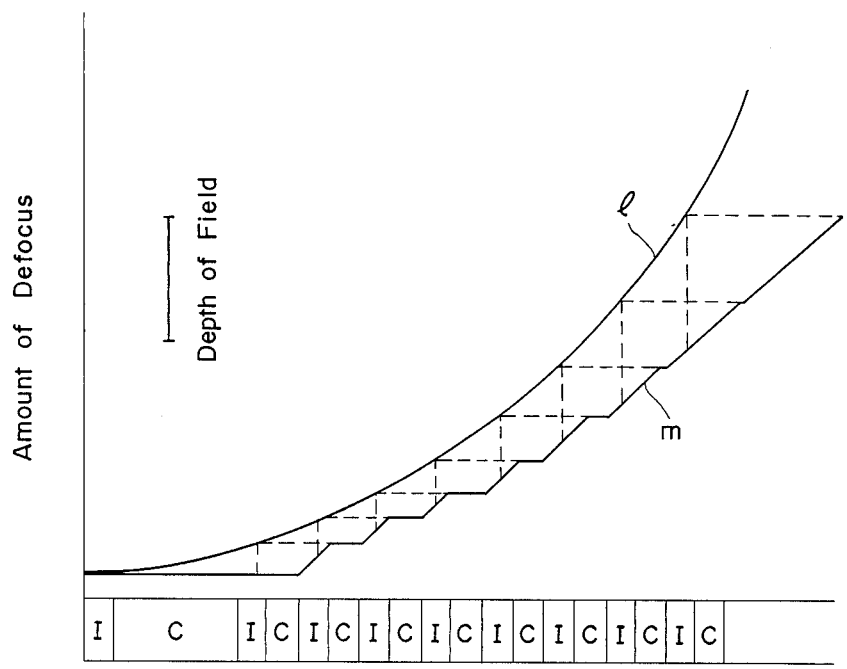
FIG. 9 is a diagram showing how the amount of defocus changes chasing a moving object due to the shift range restriction shown in FIG. 8 in a continuous automatic focusing.
Figure 15:
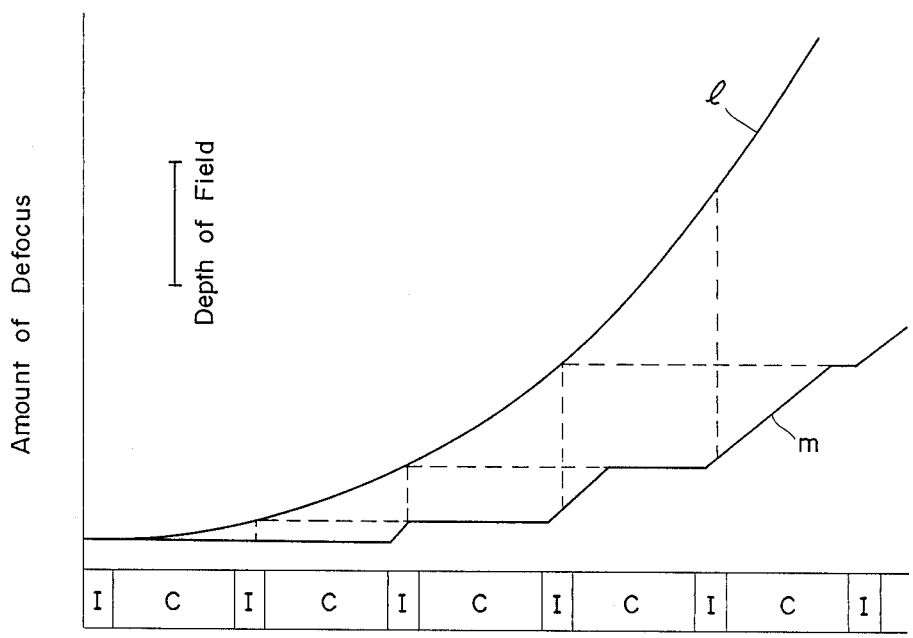
FIG. 15 is a diagram showing how the amount of focus changes in the case of a prior art focus detection device in a continuous automatic focusing.

According to the first embodiment, the time required for calculating the amount of defocus becomes shorter. Therefore, as shown in FIG. 9, the lens 2 can chase or follow up the object relatively easily during movement of the object and enters the depth of field, so it is easy to obtain in-focus condition.

<c—2> SECOND EMBODIMENT

A modification of the calculation of the amount of defocus will now be explained. In this example, the shift range in the correlation calculation is narrowed utilizing the fact that the blocks I, II and III overlap each other as shown in FIG. 3. More specifically, once there is obtained an amount of shift affording the highest correlation as a whole, then using the range of ±3 pitch near the in-focus position in the second block, the maximum amount of shift $l_{max}$ is set to the amount of shift 3 pitches on the rear focus side from the amount of shift in in-focus condition, while the minimum amount of shift $l_{min}$ is set to the amount of shift 3 pitches on the front focus side from the amount of shift in in-focus condition (see FIG. 8-ⓒ).

Figure 8:
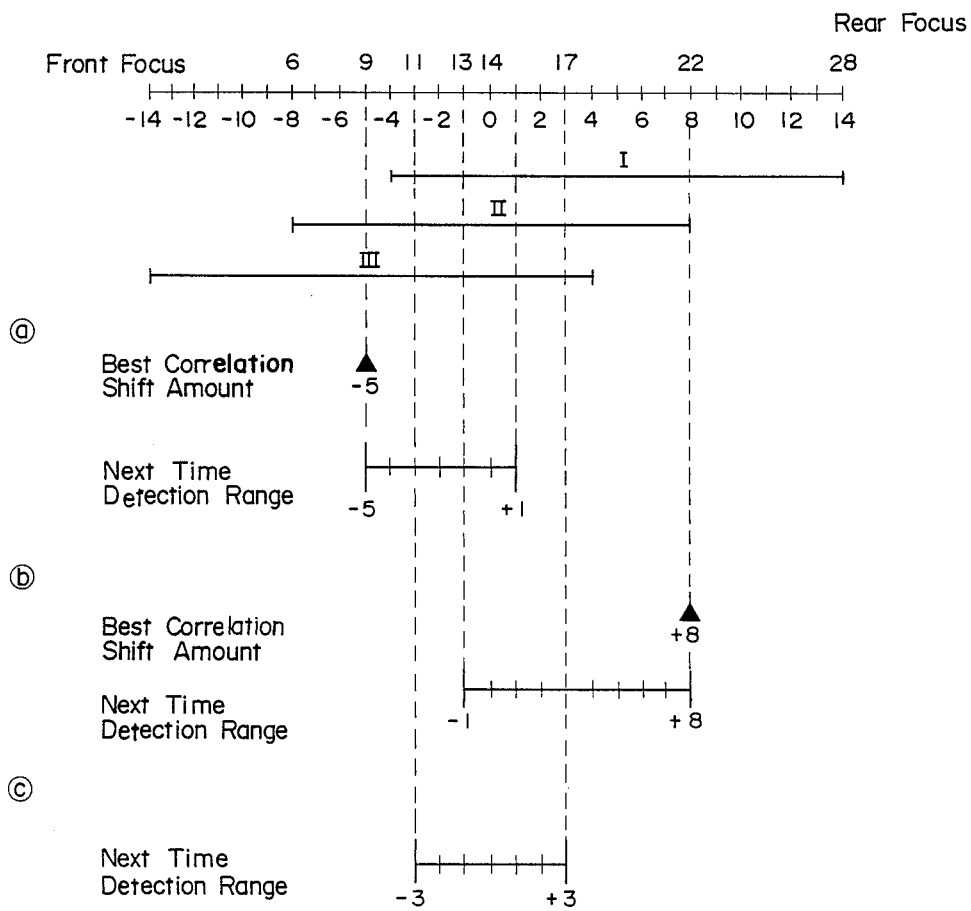
FIG. 8 is a diagram showing examples of the shift range restriction as effected through execution of the flow charts shown in FIGS. 7 and 10.

As shown in FIG. 8-ⓒ, no matter how much the deviation may be as a result of the last calculation, the present correlation detection range is assumed to be from $-3$ pitch to $+3$ pitch; that is, $l_{min}$ and $l_{max}$ are 11 and 17, respectively, since this range may be determined according to the lens driving speed in the automatic focusing system, the range of $-3$ to $+3$ pitch may be replaced by the range of $-4$ to $+4$ pitch or any other range.

If the detection is impossible, correlation is determined in the first block and then in the third block. This can be done because the first and third blocks overlap the remaining portions of the second block which are ±3 pitches off. For example, if the overlap is from the positions ±4 pitches off, it follows that the maximum amount of shift is $l_{max}+4$ and the minimum amount of shift is $l_{min}-4$.

No matter how much the amount of shift affording the highest correlation as a whole may be as a result of the last calculation, the shift range for the present calculation is restricted to a predetermined range on both sides of the amount of shift in in-focus condition and so the calculation becomes simpler.

Figure 10:
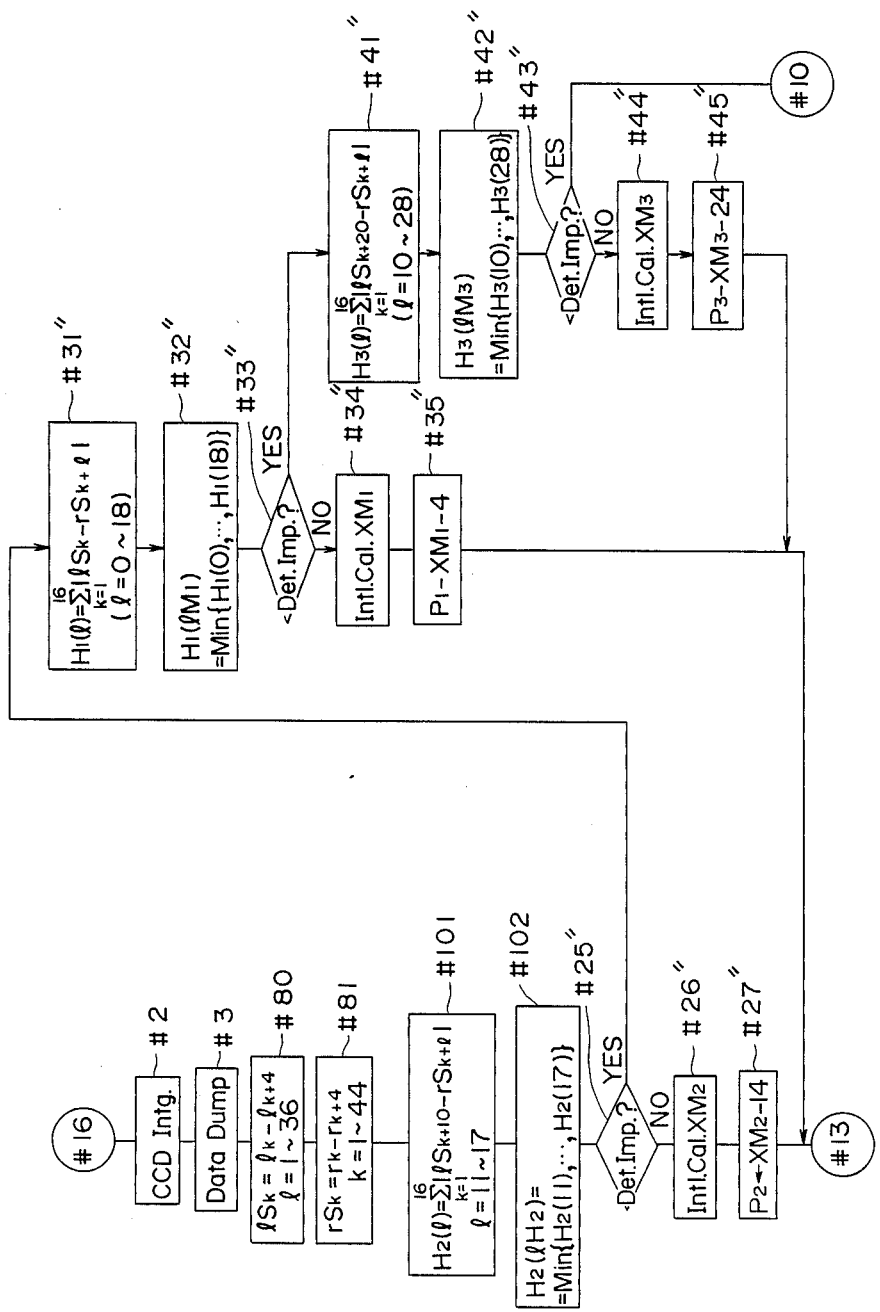
FIG. 10 is a flow chart modified from the flow chart shown in FIG. 4 for a second embodiment of the focus detection device of the present invention.
Figure 11:
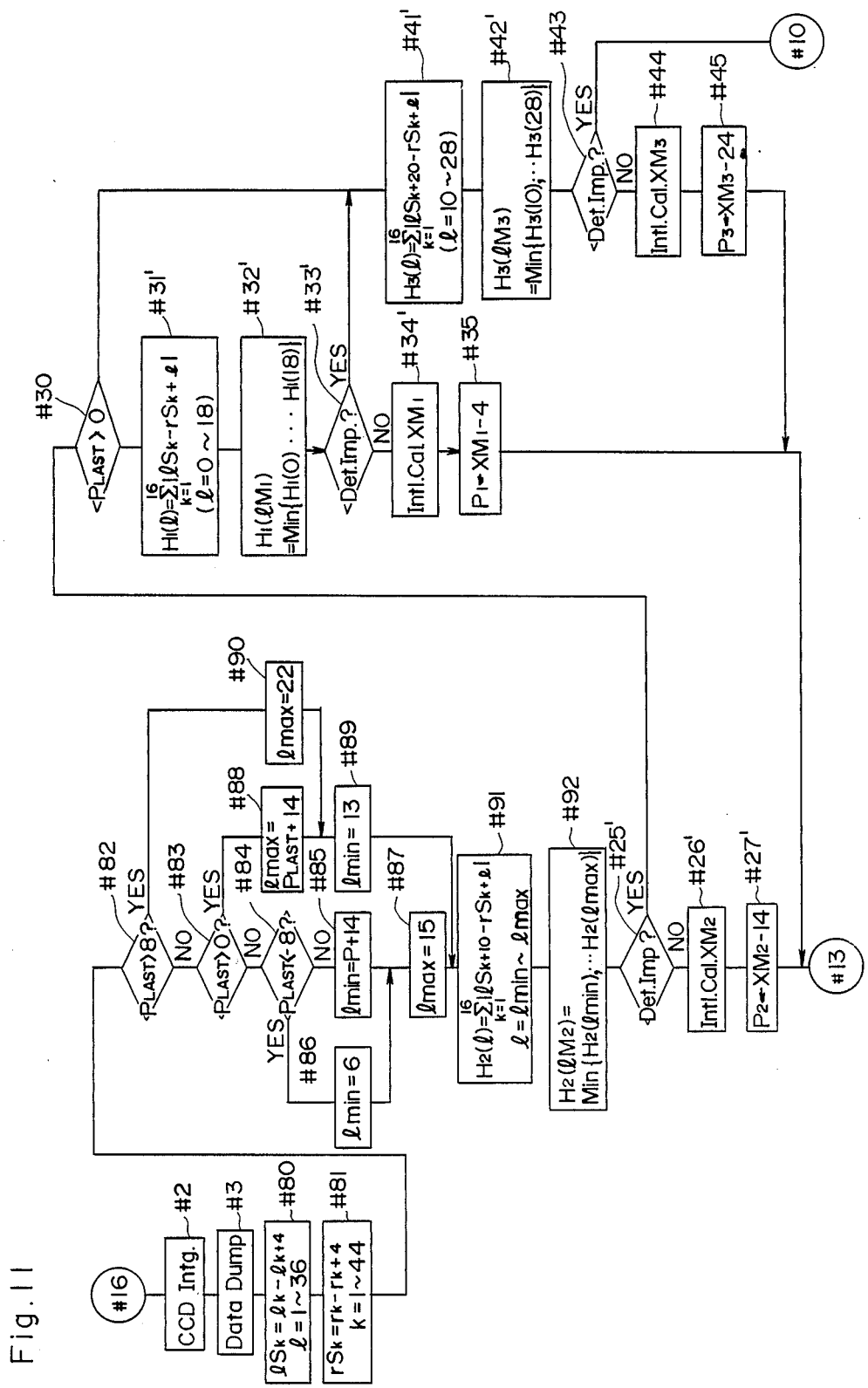
FIG. 11 is a flow chart showing a modification of the flow shown in FIG. 7.

A flow of this second embodiment is shown in FIG. 10, which flow represents the steps corresponding to #2' to #9' in FIG. 2. The steps from #2' to #81 is the same as in FIG. 7. The range of $l_{min}$ and $l_{max}$ is adopted for each automatic focusing system adopted and here it is set at 11 to 17, corresponding to the range from −3 to +3 pitch in terms of deviation pitch. In the correlation calculation at #102, correlation calculation is effected in the range of $l=11-17$, then in #102 the amount $lM_2$ of shift affording the highest correlation is determined, and in #25" there is made a judgment as to whether it is possible to effect the focus detection or not. If the answer is affirmative, a deviation pitch $P_2$ is determined in #26" and #27" and the operation proceeds to #13 in FIG. 2, followed by the same operations as in the embodiment of $<c-1>$. If the focus detection is impossible in #25", then like the first embodiment, there are performed the correlation calculation for the first block in #31" to #35" and that for the third block in #41" to #45", then the operation proceeds to #13 or #10 in FIG. 2.

$<c-3>$ MODIFICATION

In the $<c-1>$ − (III) and $<c-2>$ explained above, where the detection is impossible, it is not suitable, for increasing the speed of detection, to carry out the focus detection using the first and then the third block. More particularly, in the case of front focus last time, it is generally difficult to consider that the maximum correlation will be obtained in the first block on the rear focus side immediately this time, even due to movement of the lens. In this case, therefore, the third block ought to be used if the detection using the second block is impossible.

Figure 12:
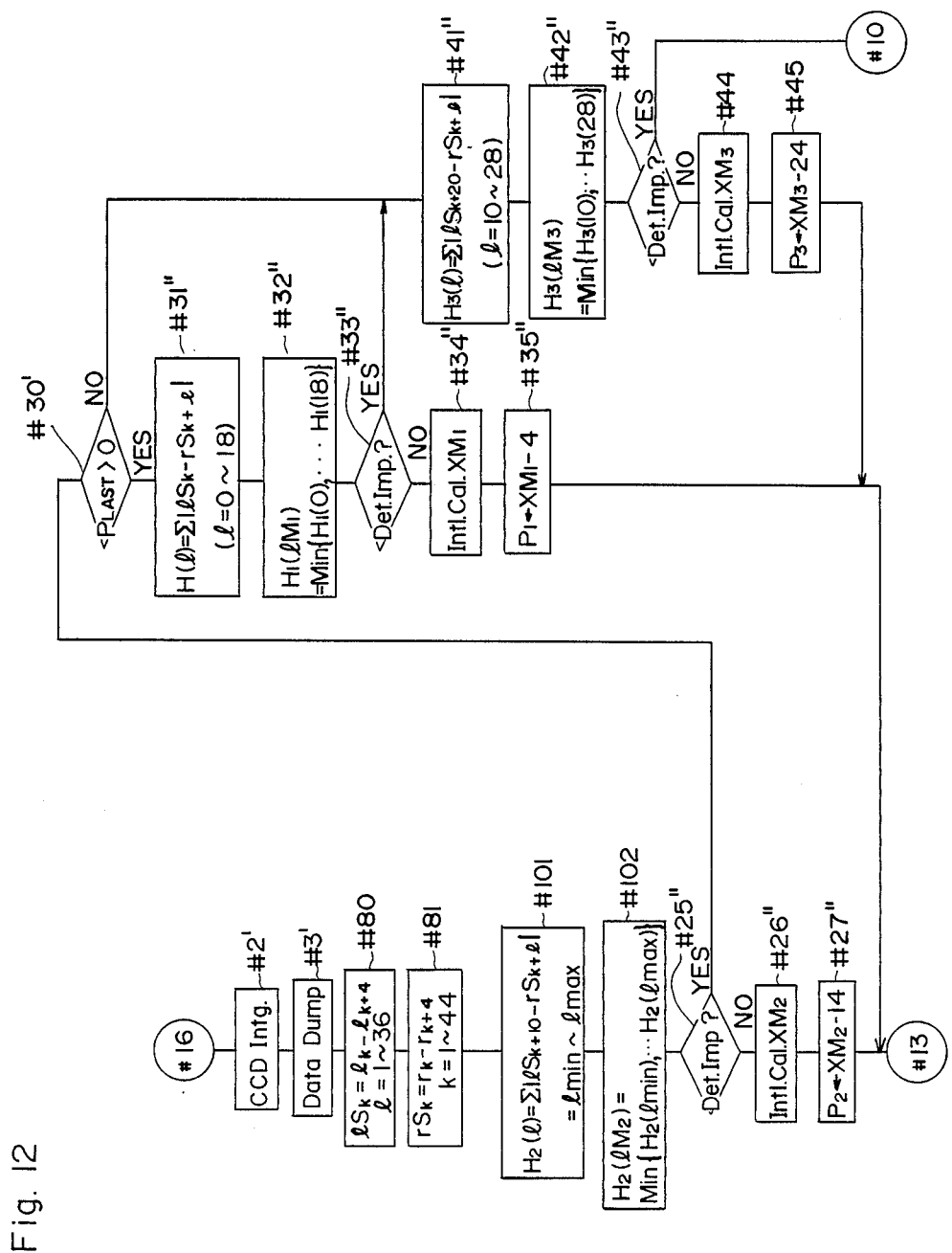
FIG. 12 is a flow chart modified from the flow chart shown in FIG. 10.

In the modification from the first embodiment, illustrated in FIG. 12, whether $P_{LAST}$ is larger than 0 or not is judged in step #30, and if the answer is affirmative (rear focus), the operation proceeds to #31' to perform the correlation calculation using the first block, while if the answer is negative (front pin) in #30, the operation advances directly to #41' to conduct the correlation calculation using the third block.

However, when the focus detection is impossible (Y in #33') after the operation advanced to the correlation calculation using the first block in response to $P_{LAST}>0$, the operation proceeds to #41' to perform a like calculation using the third block. This is because a sudden movement of the object may cause an immediate transfer from the rear focus to the front focus condition and it is worth while to effect the correlation calculation using the third block. Conversely, when $P_{LAST}<0$ in #30, the operation proceeds to #41' and #42', and when the detection is impossible in #43', the operation once returns to #31' without advancing to #10, and thereafter when the detection is impossible in #33', the operation proceeds to #10. The flow from #33' to #41' or the flow from #43' to #10' is not always necessary.

Figure 13:
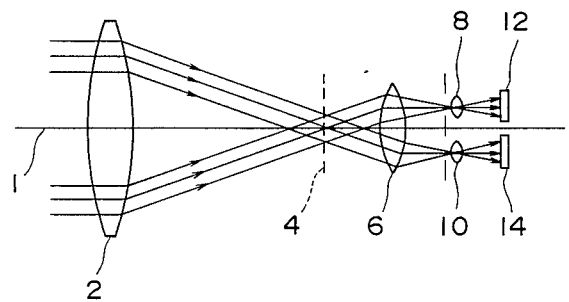
FIG. 13 is a diagram of a prior art focus detection optical system which is also used for the focus detection device of the present invention.
Figure 14:
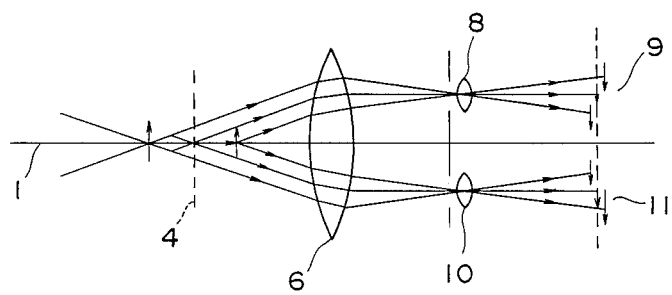
FIG. 14 is a diagram of the optical system show in FIG. 13, for explaining how images are formed by re-imaging lenses 8 and 10 in in-focus, front focus and rear focus conditions, respectively.

Also in the modification from the second embodiment, illustrated in FIG. 13, the flow after the judgment in #33" is the same as in FIG. 12.

In the case of FIG. 12, $P_{LAST}>8$ or $P_{LAST}<8$ is judged instead of the judgment of $P_{LAST}>0$, and the operation proceeds to #31' when $P_{LAST}>8$, or to #41' when $P_{LAST}<-8$, and when the condition of $P_{LAST}$ falls under neither of them, the correlation calculation using the first block beginning with #31' and that using the third block beginning with #41 are performed successively in this order, or the operation proceeds to #10 directly.

What is claimed is:

1. A focus detection device comprising:
   an objective lens;
   optical means for forming first and second images of an object so that the relative position of said first and second images varies with the focus condition of said objective lens;
   first and second image sensor arrays for sensing said first and second images and for producing first and second image signals representing the light intensity distributions of said first and second images, respectively;
   calculation means for shifting one of said first and second image signals relative to the other to calculate correlations between said first and second image signals and thereby to find an amount of shift affording the highest correlation;
   focus condition signal producing means for producing a focus condition signal representing the focus condition of said objective lens in accordance with said amount of shift found to afford the highest correlation;
   control means for repeatedly operating said calculation means;
   shift range restriction means for restricting the range of shift for a present correlation calculation by said calculation means, in accordance with said amount of shift found through the last correlation calculation by said calculation means, to afford the highest correlation;
   reliability determination means for determining the reliability of a correlation calculation of said calculation means; and
   inhibition means for inhibiting the operation of said shift range restricting means, to permit said calculating means to calculate correlation over its entire permissible range of shift when the determination by said reliability determining means indicates that the calculation result of said calculation means was not reliable.

2. A focus detection device as claimed in claim 1, wherein said shift range restriction means includes:
   first means for restricting the range of shift for the present correlation calculation to a first range between said amount of shift found through the last correlation calculation by said calculation means, said first restricting means to afford the highest correlation and an amount of shift which is on the front focus side by a first predetermined amount from an amount of shift affording the highest correlation in an in-focus condition, when said amount of shift found through the last correlation calculation by said calculation means was on the rear focus side with respect to the amount of shift affording the highest correlation in the in-focus condition; and second means for restricting the range of shift for the present correlation calculation to a second range between said amount of shift found through the last correlation calculation by said calculation means, said second restricting means to afford the highest correlation and an amount of shift which is on the rear focus side by a second predetermined amount from the amount of shift providing the highest correlation in the in-focus condition, when said amount of shift found through the last correlation calculation by said calculation means was on the front focus side with respect to the amount of shift affording the highest condition in the in-focus condition.

3. A focus detection device as claimed in claim 1, wherein said shift range restriction means includes means for restricting the range of shift, for the present correlation calculation, to a range with a predetermined width, centering at the amount of shift providing the highest correlation in an in-focus condition.

4. A focus detection device as claimed in claim 2, wherein said first and second predetermined amounts are identical.

5. A focus detection device comprising:
an objective lens;
optical means for forming first and second images of an object so that the relative position of said first and second images varies with the focus condition of said objective lens;
first and second image sensor arrays for sensing said first and second images and for producing first and second image signals representing light intensity distributions the first and second image signals, respectively;
calculation means for shifting one of said first and second image signals relative to the other to calculate correlations between said first and second image signals and thereby to find an amount of shift affording the highest correlation;
focus condition signal producing means for producing a focus condition signal representing the focus condition of said objective lens in accordance with said amount of shift found to afford the highest correlation;
control means for repeatedly operating said calculation means; and
shift range restriction means for restricting the range of shift for a present correlation calculation by said calculation means to a first range between said amount of shift found to afford the highest correlation through the last correlation calculation by said calculation means and an amount of shift which is on the front focus side by a first predetermined amount from an amount of shift affording the highest correlation in an in-focus condition, when said amount of shift found through the last correlation calculation by said calculation means to afford the highest correlation was on the rear focus side with respect to the amount of shift affording the highest correlation in the in-focus condition, said restriction means also restricting the range of shift for a present correlation calculation by said calculation means to a second range between said amount of shift found through the last correlation calculation by said calculation means to afford the highest correlation and an amount of shift which is on the rear focus side by a second predetermined amount from the amount of shift affording the highest correlation in the in-focus condition, when said amount of shift found through the last correlation calculation by said calculation means to afford the highest correlation was on the front focus side with respect to the amount of shift affording the highest correlation in the in-focus condition.

6. A focus detection device as claimed in claim 5, wherein said first and second predetermined amounts are identical.

7. An automatic focusing device comprising:
an objective lens;
optical means for forming first and second images of an object so that the relative position of said first and second images varies with the focus condition of said objective lens;
first and second image sensor arrays for sensing said first and second images to produce first and second image signals representing light intensity distributions thereon, respectively;
calculation means for shifting one of said first and second image signals relative to the other to calculate correlations between said first and second image signals and thereby to find an amount of shift affording the highest correlation;
focus condition signal producing means for producing a focus condition signal representing the focus condition of said objective lens in accordance with said amount of shift found to afford the highest correlation;
lens drive means for driving said objective lens to an in-focus position in accordance with said focus condition signal;
reliability determination means for determining reliability of the calculation results of said calculation means;
control means for repeatedly operating said calculation means;
shift range restriction means for restricting the range of shift for the present correlation calculation by said calculation means to a range with a predetermined width centering at an amount of shift affording the highest correlation in an in-focus condition; and
inhibition means for inhibiting the operation of said shift range restriction means, to permit said calculating means to calculate correlations over its entire permissible range of shift when the determination by said reliability determination means indicates that the calculation result of said calculation means was not reliable.

8. An improved method for focus detection in a camera or video device having an objective lens, comprising the steps of:
forming first and second images of an object so that the relative position of said first and second images varies with the focus condition of said objective lens;
providing first and second image sensor arrays for sensing said first and second images and for producing first and second image signals representing the light intensity distributions of said first and second images, respectively;
calculating correlations between said first and second image signals by shifting one of said first and second image signals relative to the other to find an amount of shift affording the highest correlation;
producing a focus condition signal representing the focus condition of said objective lens in accordance with said amount of shift found to afford the highest correlation;

repetitiously operating said calculation step;

restricting the range of shift for a present correlation calculation by said calculating step, in accordance with said amount of shift found through the last correlation calculation by said calculating step to afford the highest correlation;

determining the reliability of a correlation calculation result of said calculating step, and inhibiting the operation of said shift range restricting step, to permit said calculating step to calculate correlations over its entire permissible range of shift when the determination by said reliability determining means indicates that the calculation result of said calculation means was not reliable.

* * * * *